US012794055B2

(12) United States Patent

Kim et al.

(10) Patent No.: US 12,794,055 B2

(45) Date of Patent: Nov. 10, 2026

(54) CASE FOR SECONDARY BATTERY, AND SECONDARY BATTERY, MODULE, AND DEVICE COMPRISING SAME

(71) Applicant: SK On Co., Ltd., Seoul (KR)

(72) Inventors: Kyu Beom Kim, Daejeon (KR); Chae Rin Ryou, Daejeon (KR); Jeong Hyeon Yun, Daejeon (KR); Hyea Won Yun, Daejeon (KR); Ji Hyeon Lee, Daejeon (KR); Jong Chan Im, Daejeon (KR)

(73) Assignee: SK On Co., Ltd., Seoul (KR)

( * ) Notice: Subject to any disclaimer, the term of this patent is extended or adjusted under 35 U.S.C. 154(b) by 760 days.

(21) Appl. No.: 18/086,153

(22) Filed: Dec. 21, 2022

(65) Prior Publication Data

US 2023/0253655 A1 Aug. 10, 2023

(30) Foreign Application Priority Data

Feb. 9, 2022 (KR) ........................ 10-2022-0017196

(51) Int. Cl.

*H01M 50/197* (2021.01)
*H01M 50/188* (2021.01)
*H01M 50/193* (2021.01)

(52) U.S. Cl.

CPC ....... *H01M 50/197* (2021.01); *H01M 50/188* (2021.01); *H01M 50/193* (2021.01)

(58) Field of Classification Search

CPC ............. H01M 50/105; H01M 50/553; H01M 50/103; H01M 50/119; H01M 50/121; H01M 50/124; H01M 50/133; H01M 50/176; H01M 50/184; H01M 50/186; H01M 50/188; H01M 50/193; H01M 50/197; H01M 50/55; Y02E 60/10

See application file for complete search history.

(56) References Cited

U.S. PATENT DOCUMENTS

| | | | | |
|---|---|---|---|---|
| 4,424,252 A | 1/1984 | Nativi | | |
| 2012/0219847 A1 * | 8/2012 | Hong | .................... | H01M 50/55 29/623.2 |

(Continued)

FOREIGN PATENT DOCUMENTS

| | | | |
|---|---|---|---|
| JP | H11176996 A | 7/1999 | |
| JP | 2018504467 A | 2/2018 | |

(Continued)

*Primary Examiner* — Miriam Stagg

*Assistant Examiner* — Lilia Nedialkova

(74) *Attorney, Agent, or Firm* — The Webb Law Firm

(57) ABSTRACT

Provided is a case for a secondary battery accommodating an electrode assembly, including a lower member, an upper member disposed above the lower member, and a sealing part to which the lower member and the upper member are fused to seal the case. The sealing part includes a first sealing part in which an electrode terminal connected to the electrode assembly exists and a second sealing part which is a remaining area except for the first sealing part. The case includes a polymer resin layer formed on an edge of the first sealing part and a reinforcing layer surrounding the polymer resin layer. The case for a secondary battery has improved water resistance, insulation and mechanical properties. Also provided is a secondary battery, a module, and a device including the same.

13 Claims, 8 Drawing Sheets

C - C'

(56) References Cited

U.S. PATENT DOCUMENTS

| | | | | |
|---|---|---|---|---|
| 2014/0053286 | A1* | 2/2014 | Adams | G06F 21/86<br>726/34 |
| 2015/0197642 | A1* | 7/2015 | Boday | C09D 7/67<br>427/96.4 |
| 2017/0194606 | A1* | 7/2017 | Lim | H01M 50/578 |
| 2021/0028417 | A1* | 1/2021 | Yim | H01M 50/186 |

FOREIGN PATENT DOCUMENTS

| | | | |
|---|---|---|---|
| KR | 1020060037850 | A | 5/2006 |
| KR | 1020100071814 | A | 6/2010 |
| KR | 1020150050081 | A | 5/2015 |
| KR | 1020160046477 | A | 4/2016 |
| KR | 1020180083123 | A | 7/2018 |
| KR | 1020200075362 | A | 6/2020 |

* cited by examiner

A - A'

B - B'

C - C'

C - C'

C - C'

D - D'

CASE FOR SECONDARY BATTERY, AND SECONDARY BATTERY, MODULE, AND DEVICE COMPRISING SAME

CROSS-REFERENCE TO RELATED APPLICATION

This application claims priority to Korean Patent Application No. 10-2022-0017196, filed Feb. 9, 2022, the disclosure of which is hereby incorporated by reference in its entirety.

BACKGROUND OF THE INVENTION

Field of the Invention

The present disclosure generally relates to a case for a secondary battery including a polymer resin layer formed on the edge of a sealing part in which an electrode terminal connected to an electrode assembly exists and a reinforcing layer surrounding the polymer resin layer, and a secondary battery, module, and device including the same.

Description of Related Art

With the development of electronics, communication and space industries, the demand for secondary batteries as an energy power source is rapidly increasing. In particular, as the importance of global eco-friendly policies is emphasized, the electric vehicle market is growing rapidly, and R&D on secondary batteries is being actively conducted at home and abroad.

In general, a secondary battery is manufactured by accommodating an electrode assembly including a negative electrode, a positive electrode, and a separator in a case for a secondary battery, cutting the part where the electrode terminal exists in order to process the case into a required shape, and then sealing the edge of the case. FIG. 1 schematically illustrates a case for a secondary battery in which a conventional electrode assembly is accommodated. Referring to FIG. 1, a case 100 for a secondary battery accommodating an electrode assembly 110 includes upper and lower members 120, electrode terminals 140, 141 connected to the electrode assembly 110, and a sealing part to which the upper and lower members 120 are fused to seal the case 120.

FIG. 2 schematically illustrates a cross section of the case of FIG. 1 cut along A-A'. Referring to FIGS. 1 and 2, the edge of the sealing part where the electrode terminal exists has a structure in which polyolefin-based resin layers 11*c*, 12*c*, metal layers 11*b*, 12*b* and protective layers 11*a*, 12*a* are laminated, and the polyolefin-based resin layers 11*c*, 12*c*, the metal layers 11*b*, 12*b*, and the protective layers 11*a*, 12*a* are exposed to the external environment. The polyolefin-based resin layers 11*c*, 12*c* are more vulnerable to moisture than the metal layers 11*b*, 12*b* and the protective layers 11*a*, 12*a*, and the metal layers 11*b*, 12*b* had a problem in that a short circuit with the electrode terminal 141 occurs due to electrical characteristics.

In addition, to improve water resistance and insulation, a method of changing the coupling shape of the sealing part has been devised, but there is a problem that the volume or weight of the case 100 is deformed, and in particular, a problem that the battery performance rapidly deteriorated due to the occurrence of a venting phenomenon in which the sealing of the case 100 is released due to an impact applied from the outside remained.

SUMMARY OF THE INVENTION

Embodiments provide a case for a secondary battery in which a polymer resin layer and a reinforcing layer surrounding the polymer resin layer are formed on the edge of a sealing part where an electrode terminal connected to an electrode assembly exists, thereby improving battery performance, and a secondary battery, a module, and device including the same.

In accordance with an aspect of the present disclosure, there is provided a case for a secondary battery accommodating an electrode assembly, including a lower member, an upper member disposed on an upper side of the lower member, and a sealing part to which the lower member and the upper member are fused to seal the case, wherein the sealing part includes a first sealing part in which an electrode terminal connected to the electrode assembly exists and a second sealing part which is a remaining area except for the first sealing part, and wherein the case further includes a polymer resin layer formed on an edge of the first sealing part and a reinforcing layer surrounding the polymer resin layer.

According to an embodiment, the edge of the first sealing part may not be exposed to the outside by the reinforcing layer.

According to an embodiment, the first sealing part may include a 1-1 sealing part existing in a portion where the electrode terminal protrudes and a 1-2 sealing part which is a remaining area except for the portion where the electrode terminal protrudes, and edges of the 1-1 sealing part and the 1-2 sealing part may not be exposed to the outside by the reinforcing layer.

According to an embodiment, the edge of the first sealing part may be laminated with a polyolefin-based resin layer, a metal layer, and a protective layer.

According to an embodiment, the polyolefin-based resin layer may be covered by the polymer resin layer.

According to an embodiment, the polymer resin layer may include a thermosetting resin.

According to an embodiment, the polymer resin layer may include at least one selected from a group consisting of a silicone resin and an epoxy resin.

According to an embodiment, the polymer resin layer may have a thickness of 10 μm to 300 μm.

According to an embodiment, the reinforcing layer may include at least one selected from a group consisting of a silicone resin, an epoxy resin, and a rubber-based resin.

According to the embodiment, the rubber-based resin may include at least one selected from a group consisting of natural rubber (NR), styrene-butadiene rubber (SBR), butadiene rubber (BR), chloroprene rubber (CR), nitrile rubber (NBR), butyl rubber (IIR), ethylene-propylene rubber (EPDM), chlorosulfonated polyethylene rubber (CSM), acrylic rubber (ACM), and fluororubber (FPM).

According to an embodiment, a resin included in the polymer resin layer and a resin included in the reinforcing layer may have different vitrification temperatures, thermal expansion coefficients, or mechanical expansion coefficients.

According to an embodiment, the reinforcing layer may be formed of a single layer or a plurality of layers including two or more layers.

According to an embodiment, a thickness of the reinforcing layer may be 10 μm to 800 μm.

In accordance with another aspect of the present disclosure, there is provided a secondary battery including an electrode assembly including a positive electrode, a negative electrode, and a separator interposed between the positive electrode and the negative electrode, and the case for a secondary battery of the present disclosure for accommodating the electrode assembly.

A module in accordance with another aspect of the present disclosure includes the secondary battery of the present disclosure as a unit cell.

A device in accordance with another aspect of the present disclosure includes the module of the present disclosure as a power source.

In a case for a secondary battery according to the present disclosure, a polymer resin layer and a reinforcing layer are formed on the edge of the sealing part where the electrode terminal connected to the electrode assembly exists, thereby having an effect of preventing the polyolefin-based resin layer located at the edge from being exposed to the outside.

In addition, the case for a secondary battery according to the present disclosure protects the polyolefin-based resin layer from the external environment, thereby reducing the content of moisture penetrating through the polyolefin-based resin layer, thereby having an effect of preventing gas generated by the reaction of moisture and electrolyte.

In addition, the case for a secondary battery according to the present disclosure has an effect of improving water resistance without significantly affecting the volume and weight of the case, by forming the polymer resin layer and the reinforcing layer locally only on the edge of the sealing part.

In addition, the case for a secondary battery according to the present disclosure has an effect of insulating between the metal layer located on the edge and the electrode terminal, by forming a polymer resin layer and a reinforcing layer on the edge of the sealing part.

In addition, in the case for a secondary battery according to the present disclosure, a reinforcing layer surrounding the polymer resin layer is formed on the edge of the sealing part, thereby having as effect that water resistance and insulation are improved, as well as mechanical properties may be improved.

In addition, the case for a secondary battery according to the present disclosure may delay the venting phenomenon in which the sealing of the case is released due to enhanced water resistance, insulation and mechanical properties, thereby having an effect that the performance of the secondary battery including the case is maintained for a long time.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being “between” two elements, it can be the only element between the two elements, or one or more intervening elements may also be present. Like reference numerals refer to like elements throughout.

DESCRIPTION OF THE INVENTION

Structural or functional descriptions of example embodiments disclosed in the present specification or application are merely illustrative for the purpose of describing embodiments according to the technical spirit of the present disclosure, embodiments according to the technical spirit of the present disclosure may be implemented in various forms in addition to the example embodiments disclosed in the present specification or application, and the technical spirit of the present disclosure is not to be construed as being limited to the example embodiments described in the present specification or application.

Hereinafter, a case for a secondary battery according to the present disclosure, and a secondary battery, a module, and a device including the same will be described in detail.

The present disclosure relates to a case for a secondary battery accommodating an electrode assembly, including a lower member, an upper member disposed above the lower member, and a sealing part to which the lower member and the upper member are fused to seal the case, wherein the sealing part includes a first sealing part in which an electrode terminal connected to the electrode assembly exists and a second sealing part which is a remaining area except for the first sealing part, and wherein the case includes a polymer resin layer formed on an edge of the first sealing part and a reinforcing layer surrounding the polymer resin layer.

Figure 3:
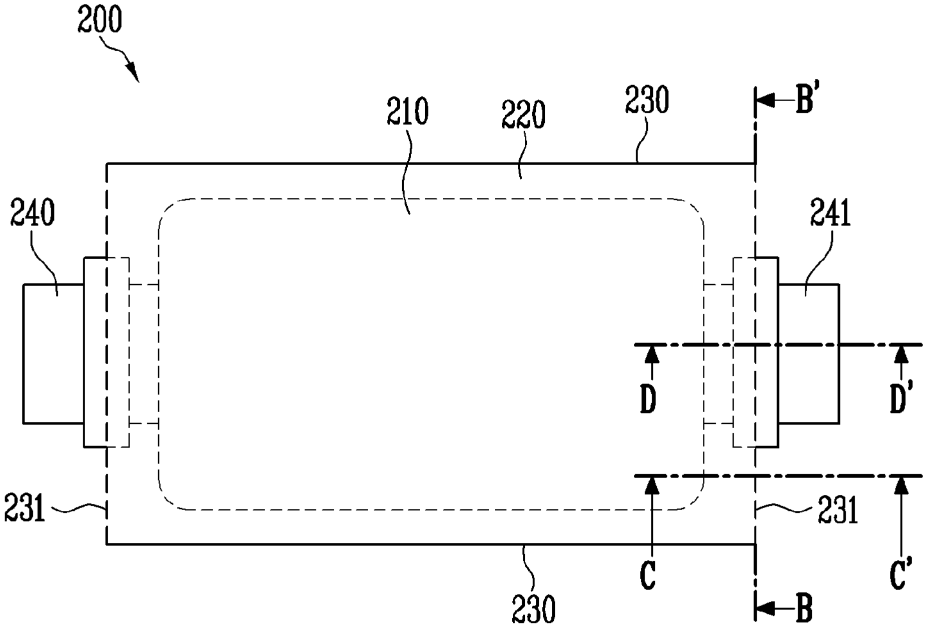
FIG. 3 schematically illustrates a case for a secondary battery in which an electrode assembly is accommodated in accordance with an embodiment of the present disclosure.

FIG. 3 schematically illustrates a case for a secondary battery in which an electrode assembly is accommodated in accordance with an embodiment of the present disclosure.

Referring to FIG. 3, a case 200 for a secondary battery according to an embodiment of the present disclosure accommodates an electrode assembly 210, and the case 200 includes a lower member 220, an upper member 220 disposed on an upper side of the lower member, and a sealing part to which the lower member 220 and the upper member 220 are fused to seal the case 200, and the sealing part includes a first sealing part 231 in which the electrode terminals 240, 241 connected to the electrode assembly 210 exist and a second sealing part 230 which is a remaining area except for the first sealing part 231.

Referring to FIG. 3, although it is shown that the electrode terminals 240, 241 connected to the electrode assembly 210 accommodated in the case 200 exist on different one side, respectively, the present disclosure is not limited thereto, and the electrode terminals 240, 241 may exist on the same side. For example, the electrode terminals 240, 241 may be a negative terminal and a positive terminal, and the negative terminal and the positive terminal may exist on different one side or on the same side. The first sealing part 231 and the second sealing part 230 may be formed by pressing or thermally sealing edges of the upper member 220 and the lower member 220.

Figure 1:
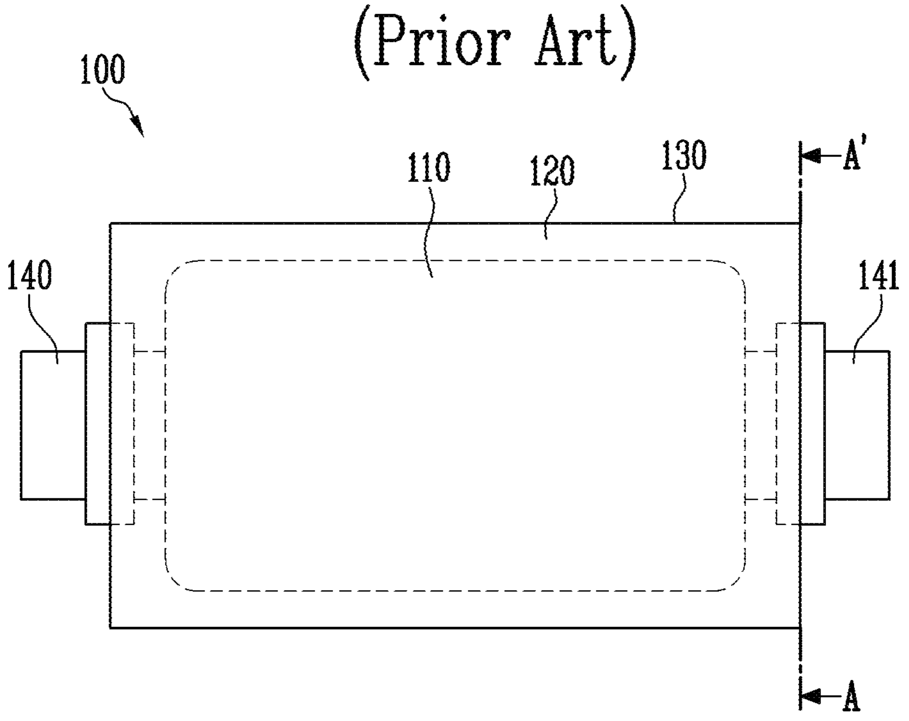
FIG. 1 (Prior Art)
FIG. 1 schematically illustrates a case for a secondary battery in which a conventional electrode assembly is accommodated.
Figure 2:
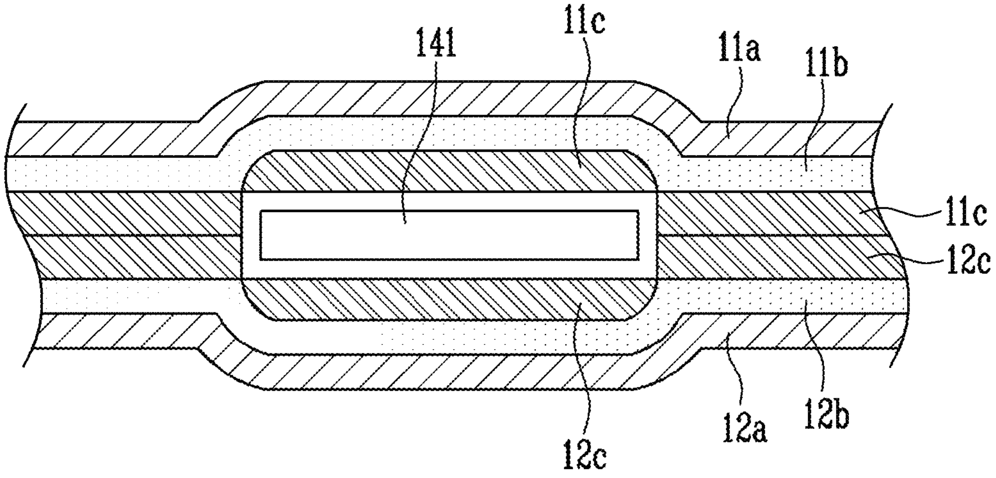
FIG. 2 (Prior Art)
FIG. 2 schematically illustrates a cross section of the case of FIG. 1 cut along A-A'.
Figure 4:
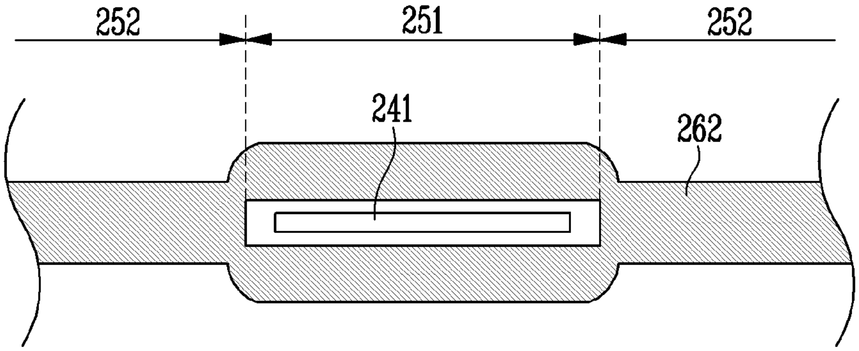
FIG. 4 schematically illustrates a cross section of the case of FIG. 3 cut along B-B'

FIG. 4 schematically illustrates a cross section of the case of FIG. 3 cut along B-B Referring to FIGS. 2 to 4, the edge of the first sealing part 231 may not be exposed to the outside by the reinforcing layer 262. For example, the first sealing part 231 include a 1-1 sealing part 251 existing in a portion where the electrode terminal 241 protrudes and a 1-2 sealing part 252 which is a remaining region except for the portion where the electrode terminal 241 protrudes, and the edges of the 1-1 sealing part 251 and the 1-2 sealing part 252 may not be exposed to the outside by the reinforcing layer 262. The conventional case 100 has a problem in that the edge of the sealing part where the electrode terminal 141 exists is exposed to the external environment, so that it is vulnerable to moisture or an electrical short circuit occurs. However, in the case 200 according to the present disclosure, a polymer resin layer and a reinforcing layer 262 surrounding the polymer resin layer are formed on the edge, and the edge is not exposed to the outside by the reinforcing layer 262, so that water resistance, insulation and mechanical properties may be improved. The edge may mean a region exposed to the outside as an end, a cross-section, or a cut surface of the first sealing part 231.

Figure 5:
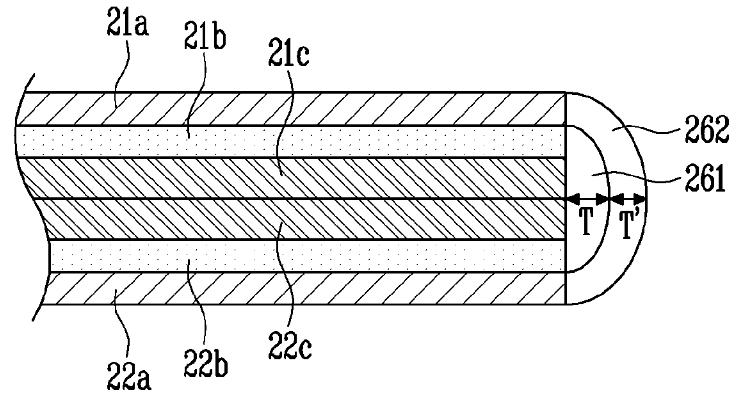
FIG. 5 schematically illustrates a cross-section of the case of FIG. 3 cut along C-C'.

FIG. 5 schematically illustrates a cross-section of the case of FIG. 3 cut along C-C'.

Referring to FIGS. 3 to 5, the edge of the first sealing part 231 may have a structure in which polyolefin-based resin layers 21*c*, 22*c*, metal layers 21*b*, 22*b*, and protective layers 21*a*, 22*a* are laminated.

The protective layers 21*a*, 22*a* may protect the electrode assembly 210 accommodated in the case 200 from an external environment. The protective layers 21*a*, 22*a* may include at least one selected from the group consisting of polyethylene terephthalate, polybutylene terephthalate, polyethylene naphthalate, polybutylene naphthalate, copolymer polyester, polycarbonate, and nylon film, but not limited thereto.

The metal layers 21*b*, 22*b* may prevent moisture from penetrating into the case 200. The metal layers 21*b*, 22*b* may include at least one selected from the group consisting of Fe, C, Cr, Mn, Cu, Al and alloys, but is not limited thereto.

The polyolefin-based resin layers 21*c*, 22*c* may be fused to seal the case 200. For example, the polyolefin-based resin layers 21*c*, 22*c* may have a form in which the polyolefin-based resin layer 21*c* included in the upper member 220 and the polyolefin-based resin layer 22*c* included in the lower member 220 is adhered to each other by a thermal fusion method. The polyolefin-based resin layers 21*c*, 22*c* may include at least one selected from the group consisting of polyethylene and polypropylene, but is not limited thereto. The polyolefin-based resin layers 21*c*, 22*c* have a weaker problem with respect to penetration of moisture than the metal layers 21*b*, 22*b* and the protective layers 21*a*, 22*a*. Therefore, when the polyolefin-based resin layers 21*c* and 22*c* are exposed to an external environment, the moisture that penetrated through the polyolefin-based resin layers 21*c*, 22*c* and electrolyte react with each other to deteriorate the performance of the battery or the case 200 may increase gas generation.

In order to solve this problem, the case 200 according to the present disclosure includes a polymer resin layer 261 formed on the edge of the first sealing part 231. The polyolefin-based resin layers 21*c*, 22*c* may be covered by the polymer resin layer 261. The polyolefin-based resin layers 21*c*, 22*c* are covered by the polymer resin layer 261 to prevent the polyolefin-based resin layers 21*c*, 22*c* from being exposed from the external environment, and the phenomenon in which the performance of the battery is deteriorated due to leakage of the electrolyte existing inside the case 200 due to moisture penetration may be reduced. In addition, when the battery is used for a long period of time, there is an effect of delaying a venting phenomenon in which the sealing of the case 200 is released due to a gas generated by a reaction between moisture and an electrolyte.

The polymer resin layer 261 may include a thermosetting resin. For example, the polymer resin layer 261 may include at least one selected from the group consisting of a silicone resin and an epoxy resin. The silicone resin and the epoxy resin have excellent water resistance and insulation, and may reduce the content of moisture penetrating through the polyolefin-based resin layers 21*c*, 22*c*, and by preventing the metal layers 21*b*, 22*b* from coming into contact with the electrode terminal 241, an electrical short circuit may be prevented.

The thickness T of the polymer resin layer 261 may be 10 μm to 300 μm, 10 μm to 250 μm, or 20 μm to 200 μm. When the thickness range is satisfied, moisture penetration may be effectively blocked without degrading the workability of the case 200.

The polymer resin layer 261 may prevent moisture from penetrating through the polyolefin-based resin layers 21*c*, 22*c*, but physical properties of the polymer resin layer 261 may deteriorate when the battery is used for a long period of time. In addition, since the polymer resin layer 261 lacks mechanical properties, there may be a problem that the polymer resin layer 261 is detached from the polyolefin-based resin layers 21*c*, 22*c* due to an impact applied from the outside.

To solve this problem, the case 200 according to the present disclosure includes a reinforcing layer 262 surrounding the polymer resin layer 261 formed on the edge of the first sealing part 231. The reinforcing layer 262 may supplement the mechanical properties of the polymer resin layer 261, so that the desorption of the polymer resin layer 261 from the polyolefin-based resin layers 21*c*, 22*c* by the impact applied form the outside may be delayed. In addition, the reinforcing layer 262 may supplement the water resistance of the polymer resin layer 261, so the venting phenomenon in which the sealing of the case 200 is released may be delayed due to the gas generated by the reaction between moisture and the electrolyte even when the battery is used for a long period of time. In addition, the reinforcing layer 262 may supplement the insulation of the polymer resin layer 261, preventing the metal layers 21*b*, 22*b* from coming into contact with the electrode terminal 241, and it is possible to more effectively prevent the occurrence of an electrical short circuit.

The reinforcing layer 262 may include at least one selected from the group consisting of a silicone resin, an epoxy resin, and a rubber-based resin. The silicone resin and the epoxy resin may be the same as or different from the silicone resin and the epoxy resin included in the polymer resin layer 261. The silicone resin and the epoxy resin may supplement water resistance and insulation properties of the polymer resin layer 261. The rubber-based resin may include at least one selected from the group consisting of natural rubber (NR), styrene-butadiene rubber (SBR), butadiene rubber (BR), chloroprene rubber (CR), nitrile rubber (NBR), butyl rubber (IIR), ethylene-propylene rubber (EPDM), chlorosulfonated polyethylene rubber (CSM), acrylic rubber (ACM), and fluoro rubber (FPM). Since the rubber-based resin has excellent mechanical properties, it is possible to delay the desorption of the polymer resin layer 261 from the polyolefin-based resin layers 21*c*, 22*c* due to an impact applied from the outside.

The resin included in the polymer resin layer 261 and the resin included in the reinforcing layer 262 may have different vitrification temperatures, thermal expansion coefficients, or mechanical expansion coefficients. When the resin included in the polymer resin layer 261 and the resin included in the reinforcing layer 262 have different physical properties, the degree of deformation of the resins varies according to the pressure and temperature applied from the outside, and water resistance, insulation, and mechanical properties of the polymer resin layer 261 and the reinforcing layer 262 may be implemented to be complementary to each other.

Figure 6:
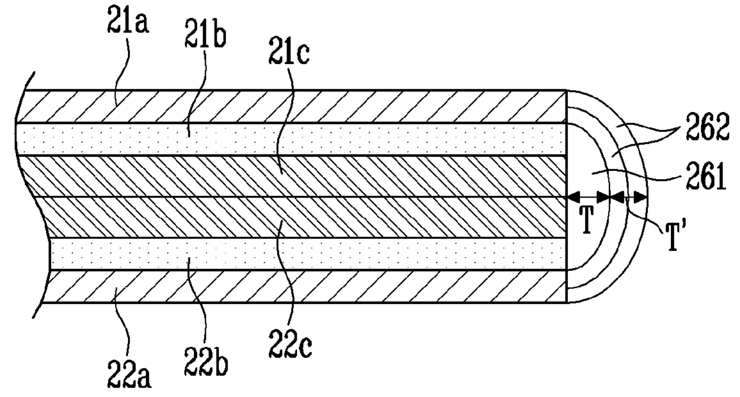
FIG. 6 schematically illustrates a case for a secondary battery in which a plurality of reinforcing layers are formed in accordance with an embodiment of the present disclosure.
Figure 7:
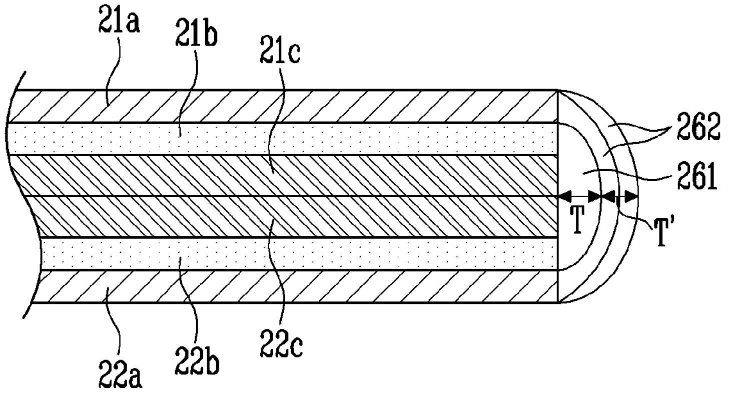
FIG. 7 schematically illustrates a case for a secondary battery in which a plurality of reinforcing layers are formed in accordance with another embodiment of the present disclosure.

FIGS. 6 and 7 schematically illustrate a case for a secondary battery in which a plurality of reinforcing layers are formed according to an embodiment of the present disclosure. Referring to FIGS. 6 and 7, the reinforcing layer 262 may be formed of a single layer or a plurality of layers of two or more. FIGS. 6 and 7 illustrate various shapes of the reinforcing layer 262 formed in two layers on the polymer resin layer 261, but is not limited thereto, and if necessary, the reinforcing layer 262 may be formed in three layers on the polymer resin layer 261. When the plurality of reinforcing layers 262 are formed on the polymer resin layer 261, more improved mechanical properties may be realized, and thus the performance of the secondary battery including the case may be maintained for a long period of time.

The thickness T' of the reinforcing layer 262 may be 10 μm to 800 μm, 10 μm to 700 μm, or 20 μm to 500 μm. When the thickness range is satisfied, moisture penetration may be effectively blocked without deterioration of the workability and mechanical properties of the case.

Figure 8:
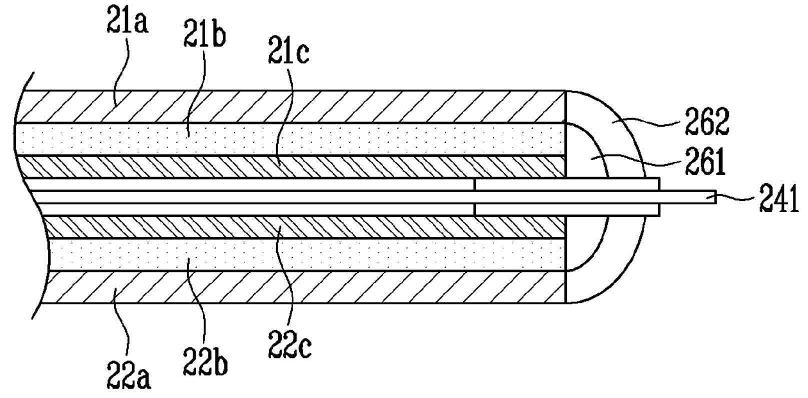
FIG. 8 schematically illustrates a cross-section of the case of FIG. 3 cut along D-D'.

FIG. 8 schematically illustrates a cross-section of the case of FIG. 3 cut along D-D'. Referring to FIGS. 3, 4 and 8, the polymer resin layer 261 and the reinforcing layer 262 are formed at the edge of the first sealing part 231 in which the electrode terminal 241 exists. For example, the polymer resin layer 261 and the reinforcing layer 262 may be formed on the upper and lower portions of the electrode terminal 241, and may be formed on the upper and lower portions of the sealant disposed on the electrode terminal 241. By forming the polymer resin layer 261 and the reinforcing layer 262 at the edge of the first sealing part 231 where the electrode terminal 241 exists, it is possible to prevent the occurrence of a short circuit due to contact between the electrode terminal 241 located in the 1-1 sealing part 251 and the metal layers 21*b*, 22*b* located at the edge of the 1-2 sealing part 252.

A secondary battery according to the present disclosure includes an electrode assembly including a positive electrode, a negative electrode, and a separator interposed between the positive electrode and the negative electrode, and a case for a secondary battery according to the present disclosure for accommodating the electrode assembly.

The positive electrode and the negative electrode may include a current collector and an active material layer disposed on the current collector, respectively. For example, the positive electrode may include a positive electrode current collector and a positive electrode active material layer, and the negative electrode may include a negative electrode current collector and a negative electrode active material layer.

The current collector may include a known conductive material in a range that does not cause a chemical reaction in the lithium secondary battery. For example, the current collector may include any one of stainless steel, Ni, Al, Ti, Cu, and alloys thereof, and may be provided in various forms, such as film, sheet, foil, and the like.

The active material layer includes an active material. For example, the positive electrode active material layer may include the positive electrode active material, and the negative electrode active material layer may include the negative electrode active material.

The positive electrode active material may be a material capable of intercalating and deintercalating Li ions. The positive electrode active material may be lithium metal oxide. For example, the positive electrode active material may be one of lithium manganese oxide, lithium nickel oxide, lithium cobalt oxide, lithium nickel manganese oxide, lithium nickel cobalt manganese oxide, lithium nickel cobalt aluminum oxide, lithium iron phosphate-based compound, lithium manganese phosphate-based compound, lithium cobalt phosphate-based compound, and lithium vanadium phosphate-based compound, but is not necessarily limited to a specific example.

The negative electrode active material may be a material capable of intercalating and deintercalating lithium ions. For example, the negative electrode active material may be any one of crystalline carbon, amorphous carbon, carbon composite material, carbon-based material such as carbon fiber, lithium alloy, Si, and Sn. According to embodiments, the negative electrode active material may be natural graphite or artificial graphite, but is not limited to specific examples.

The positive electrode and the negative electrode may further include a binder and a conductive material, respectively.

The binder may improve mechanical stability by mediating bonding between the current collector and the active material layer. For example, the binder may be an organic binder or an aqueous binder, and may be used together with a thickener such as carboxymethyl cellulose (CMC). For example, organic binder is one of vinylidenefluoride-hexafluoropropylene copolymer (PVDF-co-HFP), polyvinylidenefluoride (PVDF), polyacrylonitrile, and polymethylmethacrylate, and the aqueous binder may be styrene-butadiene rubber (SBR), but is not necessarily limited thereto.

The conductive material may improve electrical conductivity of the lithium secondary battery. The conductive material may include a metal-based material. The conductive material may include a conventional carbon-based conductive material. For example, the conductive material may include any one of graphite, carbon black, graphene, and carbon nanotubes. Preferably, the conductive material may include carbon nanotubes.

The separator is interposed between the positive electrode and the negative electrode. The separator may be configured to prevent an electrical short circuit between the positive electrode and the negative electrode, and to generate the flow of ions.

For example, the separator may include a porous polymer film or a porous nonwoven fabric. The porous polymer film may be composed of a single layer or multiple layers including a polyolefin-based polymer such as ethylene polymer, propylene polymer, ethylene/butene copolymer, ethylene/hexene copolymer, and ethylene/methacrylate copolymer. The porous nonwoven fabric may include high melting point glass fibers and polyethylene terephthalate fibers. However, the present disclosure is not limited thereto, and in some embodiments, the separator may be a ceramic coated separator (CCS) including ceramic.

The electrode assembly includes the positive electrode, the negative electrode, and a separator. The electrode assembly may be provided in plurality, and may be sequentially laminated in the case for a secondary battery according to the present disclosure. For example, the electrode assembly may be provided in plurality, and may be wound, laminated, folded, or zigzag stacked.

The electrode assembly may be provided together with an electrolyte to manufacture a secondary battery. The electrolyte may be a non-aqueous electrolyte. The electrolyte may include a lithium salt and an organic solvent. For example, the organic solvent may include one or more selected from the group consisting of propylene carbonate (PC), ethylene carbonate (EC), diethyl carbonate (DEC), dimethyl carbonate (DMC), ethylmethyl carbonate (EMC), methylpropyl carbonate (MPC), dipropyl carbonate (DPC), vinylene carbonate (VC), dimethyl sulfoxide, acetonitrile, dimethoxyethane, diethoxyethane, sulfolane, gamma-butyrolactone, propylene sulfide, and tetrahydrofuran.

The module according to the present disclosure includes the secondary battery according to the present disclosure as a unit cell. Furthermore, the device according to the present disclosure includes the module according to the present disclosure as a power source. The case for a secondary battery according to the present disclosure may reduce the content of moisture penetrating into the case, insulate between the metal layer on the cut surface and the electrode terminal, and improve mechanical properties, and there may be an effect that the secondary battery including the case performance is maintained for a long time. Accordingly, a module including the secondary battery as a unit cell and a device including the module as a power source may have improved output characteristics, capacity, and stability.

The invention claimed is:

1. A case for a secondary battery accommodating an electrode assembly, the case comprising:

a lower member;

an upper member disposed on an upper side of the lower member; and a sealing part at which the lower member and the upper member are fused to seal the case, wherein the sealing part comprises a first sealing part in which an electrode terminal connected to the electrode assembly exists and a second sealing part which is a remaining area except for the first sealing part, wherein an edge of the first sealing part is laminated, from a top to a bottom of said edge, with a first protective layer, a first metal layer, a first polyolefin-based resin layer, a second polyolefin-based resin layer, a second metal layer, and a second protective layer, wherein the case further comprises a polymer resin layer formed on the edge of the first sealing part and a reinforcing layer surrounding a side of the polymer resin layer opposite the edge of the first sealing part, wherein, along the edge of the first sealing part, the polymer resin layer extends from a first boundary defined as an interface of the first protective layer and the first metal layer to a second boundary defined as an interface of the second metal layer and the second protective layer covering edges of the first and second metal layer and edges of the first and second polyolefin-based resin layers; and wherein, along the edge of the first sealing part, the reinforcing layer extends along an edge of the first protective layer from the first boundary to a side of the first protective layer opposite the first metal layer and extends along an edge of the second protective layer from the second boundary to a side of the second protective layer opposite the second metal layer.

2. The case according to claim 1, wherein the first sealing part comprises a 1-1 sealing part existing in a portion where the electrode terminal protrudes and a 1-2 sealing part which is a remaining area except for the portion where the electrode terminal protrudes, and edges of the 1-1 sealing part and the 1-2 sealing part are not exposed to the outside by the reinforcing layer.

3. The case according to claim 1, wherein the polymer resin layer comprises a thermosetting resin.

4. The case according to claim 1, wherein the polymer resin layer comprises at least one selected from a group consisting of a silicone resin and an epoxy resin.

5. The case according to claim 1, wherein the polymer resin layer has a thickness of 10 μm to 300 μm.

6. The case according to claim 1, wherein the reinforcing layer comprises at least one selected from a group consisting of a silicone resin, an epoxy resin, and a rubber-based resin.

7. The case according to claim 6, wherein the rubber-based resin comprises at least one selected from a group consisting of natural rubber (NR), styrene-butadiene rubber (SBR), butadiene rubber (BR), chloroprene rubber (CR), nitrile rubber (NBR), butyl rubber (IIR), ethylene-propylene rubber (EPDM), chlorosulfonated polyethylene rubber (CSM), acrylic rubber (ACM), and fluororubber (FPM).

8. The case according to claim 1, wherein a resin included in the polymer resin layer and a resin included in the reinforcing layer have different vitrification temperatures, thermal expansion coefficients, or mechanical expansion coefficients.

9. The case according to claim 1, wherein the reinforcing layer is formed of a single layer or a plurality of layers comprising two or more layers.

10. The case according to claim 1, wherein a thickness of the reinforcing layer is 10 μm to 800 μm.

11. A secondary battery comprising:

an electrode assembly comprising a positive electrode, a negative electrode, and a separator interposed between the positive electrode and the negative electrode; and the case according to claim 1 for accommodating the electrode assembly.

12. A module comprising the secondary battery according to claim 11 as a unit cell.

13. A device comprising the module according to claim 12 as a power source.

* * * * *